US009656298B2

(12) United States Patent
Ericsson et al.

(10) Patent No.: US 9,656,298 B2
(45) Date of Patent: May 23, 2017

(54) COMPOSITIONS FOR COATING PIPE

(71) Applicant: Uponor Innovation AB, Fristad (SE)

(72) Inventors: Jan S. Ericsson, Lakeville, MN (US); Luke J. Brickweg, Farmington, MN (US)

(73) Assignee: UPONOR INNOVATION AB, Fristad (SE)

( * ) Notice: Subject to any disclaimer, the term of this patent is extended or adjusted under 35 U.S.C. 154(b) by 0 days.

(21) Appl. No.: 14/687,440

(22) Filed: Apr. 15, 2015

(65) Prior Publication Data

US 2015/0219250 A1 Aug. 6, 2015

Related U.S. Application Data

(62) Division of application No. 12/572,683, filed on Oct. 2, 2009, now abandoned.

(Continued)

(51) Int. Cl.
*F16L 11/04* (2006.01)
*B05D 7/00* (2006.01)
(Continued)

(52) U.S. Cl.
CPC .............. *B05D 7/546* (2013.01); *B05D 1/28* (2013.01); *B05D 3/067* (2013.01); *B32B 1/08* (2013.01); *B32B 15/08* (2013.01); *B32B 15/20* (2013.01); *B32B 27/16* (2013.01); *B32B 27/18* (2013.01); *B32B 27/20* (2013.01); *B32B 27/32* (2013.01); *C08J 7/045* (2013.01); *C08J 7/047* (2013.01); *F16L 9/121* (2013.01); *F16L 11/04* (2013.01); *B32B 2255/06* (2013.01); *B32B 2255/26* (2013.01); *B32B 2307/546* (2013.01); (Continued)

(58) Field of Classification Search
USPC ................. 138/137, 141, 146; 428/36.91
See application file for complete search history.

(56) References Cited

U.S. PATENT DOCUMENTS 4,072,770 A * 2/1978 Ting ..................... C08F 299/06
427/494
4,985,473 A * 1/1991 Williams .............. C08F 291/18
522/121

(Continued)

FOREIGN PATENT DOCUMENTS

CN ZL2009801453218 B 11/2013
EA 021372 B1 6/2015
(Continued)

OTHER PUBLICATIONS

International Preliminary Report on Patentablity issued in PCT/US2009/059417, mailed Apr. 5, 2011, 6 pages.
(Continued)

*Primary Examiner* — James Hook
(74) *Attorney, Agent, or Firm* — Faegre Baker Daniels LLP

(57) ABSTRACT

A flexible tubular member includes a flexible tubular polymeric substrate, and a coating disposed on an outer surface of the tubular substrate. The coating includes a base layer disposed on an outer surface of the tubular substrate, and a topcoat layer disposed over the base layer. The base layer includes a radiation cured cross-linked acrylate polymer. The topcoat layer includes a radiation cured cross-linked polymer.

19 Claims, 2 Drawing Sheets

Related U.S. Application Data

(60) Provisional application No. 61/102,636, filed on Oct. 3, 2008.

(51) Int. Cl.

| | | |
|---|---|---|
| *B32B 1/08* | (2006.01) | |
| *C08J 7/04* | (2006.01) | |
| *F16L 9/12* | (2006.01) | |
| *B05D 1/28* | (2006.01) | |
| *B05D 3/06* | (2006.01) | |
| *B32B 15/08* | (2006.01) | |
| *B32B 15/20* | (2006.01) | |
| *B32B 27/16* | (2006.01) | |
| *B32B 27/18* | (2006.01) | |
| *B32B 27/20* | (2006.01) | |
| *B32B 27/32* | (2006.01) | |

(52) U.S. Cl.
CPC ... *B32B 2307/71* (2013.01); *B32B 2307/7244* (2013.01); *B32B 2597/00* (2013.01); *C08J 2323/06* (2013.01); *C08J 2433/00* (2013.01); *F16L 2011/047* (2013.01); *Y10T 428/1393* (2015.01)

(56) References Cited

U.S. PATENT DOCUMENTS

| | | | |
|---|---|---|---|
| 5,360,836 A | 11/1994 | Chevallier et al. | |
| 5,590,691 A * | 1/1997 | Iorio | B29C 63/486 138/137 |
| 5,609,932 A | 3/1997 | Goetz et al. | |
| 5,725,909 A * | 3/1998 | Shaw | B05D 1/60 427/223 |
| 5,945,183 A | 8/1999 | Johnson | |
| 6,162,842 A | 12/2000 | Freche et al. | |
| 6,506,814 B2 | 1/2003 | Krongauz et al. | |
| 6,706,412 B2 * | 3/2004 | Yializis | B05D 1/60 428/461 |
| 7,238,732 B2 * | 7/2007 | Bamborough | C09J 4/00 427/207.1 |
| 7,393,901 B1 * | 7/2008 | Filiatrault | C09J 133/06 524/493 |
| 2002/0004537 A1 | 1/2002 | Krongauz et al. | |
| 2002/0133121 A1 | 9/2002 | Bierman | |
| 2002/0189697 A1 * | 12/2002 | Jarvenkyla | B29C 44/022 138/127 |
| 2003/0008087 A1 | 1/2003 | Peduto | |
| 2004/0081787 A1 * | 4/2004 | Nomura | C08G 18/329 428/36.91 |
| 2004/0214912 A1 * | 10/2004 | Rink | C08G 18/6254 522/126 |
| 2005/0136252 A1 * | 6/2005 | Chisholm | C09D 4/00 428/352 |
| 2005/0245631 A1 * | 11/2005 | Gould | C08F 265/04 522/71 |
| 2006/0128873 A1 | 6/2006 | Drysdale et al. | |
| 2006/0293403 A1 * | 12/2006 | Hubert | C08L 75/04 522/6 |
| 2007/0020451 A1 | 1/2007 | Padiyath et al. | |
| 2007/0051418 A1 * | 3/2007 | Rowles | F16L 11/045 138/137 |
| 2008/0026662 A1 | 1/2008 | Ramsey | |
| 2010/0018600 A1 | 1/2010 | Crouse et al. | |
| 2010/0084037 A1 | 4/2010 | Ericsson et al. | |
| 2010/0260941 A1 * | 10/2010 | Bushmire | C08J 7/123 427/515 |
| 2012/0010316 A1 * | 1/2012 | Meyer | B82Y 30/00 522/33 |
| 2012/0045604 A1 * | 2/2012 | Gavel | C09J 7/0282 428/41.8 |
| 2015/0217333 A1 | 8/2015 | Ericsson et al. | |
| 2015/0219250 A1 | 8/2015 | Ericsson et al. | |

FOREIGN PATENT DOCUMENTS

| | | |
|---|---|---|
| EP | 1152181 A1 | 11/2001 |
| EP | 2352785 A1 | 8/2011 |
| JP | 04292630 A | 10/1992 |
| JP | 10318448 A | 12/1998 |
| JP | 2004136899 A | 5/2004 |
| JP | 2004196337 A | 7/2004 |
| JP | 2008087322 A | 4/2008 |
| JP | 2008179787 A | 8/2008 |
| JP | 03087248 B2 | 9/2009 |
| JP | 5480279 B2 | 4/2014 |
| TW | 200722667 A | 6/2007 |
| WO | 2010040079 A1 | 4/2010 |

OTHER PUBLICATIONS

International Search Report and Written Opinion issued in PCT/US2009/059417, mailed Apr. 14, 2011, 9 pages.

Rosen, Stephen L. "Fundamental Principles of Polymeric Materials", copyright 1993, John Wiley & Sons, Inc., 2nd Edition, Chapter II Types of Polymers.

* cited by examiner

COMPOSITIONS FOR COATING PIPE

CROSS-REFERENCE TO RELATED APPLICATION

This application is a divisional of U.S. patent application Ser. No. 12/572,683, filed Oct. 2, 2009, entitled "Methods and Compositions for Coating Pipes" which claims the benefit under 35 U.S.C. §119 to U.S. Provisional Application No. 61/102,636 filed Oct. 3, 2008, and entitled "Methods and Compositions for Coating Pipes", which are hereby incorporated by reference in its entirety.

TECHNICAL FIELD

This invention relates to radiation curable coatings applied to layered plastic piping or tubing products.

BACKGROUND

Extruded plastic pipe or tubing is used for a variety of applications. For example, such plastic pipes are utilized for the transportation of water, more specifically delivery systems for hot and/or cold potable water, radiant floor heating, waste water and fire sprinkler systems, among other uses. Such plastic pipes can also be used as district heating pipes and as process pipes in the food industry, and other applications include the conveyance of liquids other than water, such as gases and slurries. Examples of thermoplastic polymers used for the manufacturing of such plastic pipes include polyolefins such as polyethylene (PE) (e.g., PE-raised temperature, or PE-RT), polypropylene (PP), polybutylenes (PB), and any copolymers thereof; polyolefin copolymers such as poly(ethylene-co-maleic anhydride); poly(vinyl chloride) (PVC); and chlorinated PVC, i.e., CPVC; etc. Such thermoplastic polymers may or may not be cross-linked, depending on the polymer system used and the desired properties of the finished pipe.

As one example of a cross-linked polymer, cross-linked polyethylene (PEX) is commonly used for plastic pipes. There are several varieties of PEX that utilize a number of different crosslinking chemistries and processing technologies. Various PEX grades further contain other additives such as antioxidants and/or stabilizer packages in different concentrations and combinations. Three known varieties of PEX for pipe applications are PEX-a, PEX-b, and PEX-c.

In the PEX-a process ("Engel Method"), the crosslinking is induced by peroxide under the influence of heat and high pressure. The resultant PEX-a composition is crosslinked through carbon-carbon bonds to form the crosslinked polymer network. The PEX-a crosslinking process occurs in the melted stage, as opposed to the primary crosslinking processes for PEX-b and PEX-c. The primary reaction is the formation of free radicals upon decomposition of the peroxide, which has to be present by definition for PEX-a, and subsequently, the free radical abstracts hydrogens from the PE polymer chains. The latter gives new carbon radicals, which next combines with neighboring PE chains to form stable carbon-carbon bonds, i.e., crosslinks. The crosslinking, which is considered to be homogeneous and uniform for PEX-a, gives degrees of crosslinking (typically referred to as CCL) in the range of 70-90% for practical applications. Requirement for CCL is to be above 70% for PEX-a as defined in ASTM International's Standard for Crosslinked Polyethylene (PEX) Tubing, F 867-04 (approved May 1, 2004).

In the PEX-b process, the crosslinking is induced by moisture and heat over extended pre-determined times typically conducted in a "Sauna atmosphere". The most commonly used methods are referred to as the Sioplas (two-steps), and the Monosil (one step) methods, respectively. In the Sioplas method, a silane, such as for example a vinylsilane is grafted to a HDPE resin prior to pipe extrusion. In the Monosil method, a silane is blended with the HDPE resin during pipe extrusion. In both methods, which are chemically different in the pre-crosslinking steps, the fundamental principle for the actual crosslinking are practically identical, i.e., the crosslinking occurs in a secondary post-extrusion process that is accelerated by a combination of heat and moisture. The latter combination is the active "reagent", which is involved in the primary hydrolysis and condensation reaction. In principle, the extruded pipe is exposed to hot water and a steam bath. A fundamental difference to PEX-a, is that for PEX-b, the resultant crosslinks are not between carbon-carbon bonds, but instead, oxygen-silicon covalent bonds (siloxane "bridges") are formed. In comparison with PEX-a, the crosslink density (CCL) are somewhat lower for PEX-b (65-70%), and the crosslinking is also less uniform.

In the PEX-c process, the crosslinking is commonly referred to as a "cold" method. In the PEX-c process, no chemicals are needed in order to facilitate the crosslinking process, but instead high energy electron beam (EB) irradiation is utilized to create the free radicals necessary for the hydrogen abstraction and subsequent crosslinking to take place. The high energy electron beams are non-selective, i.e., chemical bonds are cleaved in an un-controlled fashion. The latter has the consequence of creating side reactions, together with the reaction aimed for, i.e., the crosslinking of HDPE. The crosslinking density for PEX-c is typically in the 70-75% range, and caution has to be taken with irradiation time since a too long exposure may give discolored products and/or brittleness. PEX-c has been successfully used for many years despite the somewhat challenging production conditions.

Presently, PEX tubing has temperature and pressure ratings of 160 psi at 73.4° F. (23° C.), 100 psi at 180° F. (82.2° C.), and 80 psi at 200° F. (93.3° C.). Minimum burst ratings are at 475 psi at 73.4° F. (⅝ inch and larger). Additional performance characteristics and requirements for PEX pipes and tubing are given in the Standard for Crosslinked Polyethylene (PEX) Tubing; F 876-04 (approved May 1, 2004) and ISO 9080.

A variety of plastic pipes may be produced in the form of multi-layer plastic pipes, wherein at least one of the layers comprise the extruded thermoplastic plastic pipe as described above. Multi-layer plastic pipes are well known in the industry and have been used for all applications described herein. Additional layers are currently used to provide various desired properties, for example oxygen barrier properties, UV light protection, scratch resistance and enhanced mechanical performance, long-term stability (known as chlorine resistance in accordance with F876 and ASTM 2023), visual appearance in order to create esthetic values and/or for labeling purposes, etc.

In one example, for an oxygen barrier, such additional layers may be produced from thermoplastic non-crosslinked poly(ethylvinylalcohol). For the same purpose, metallic layers can be used, for example aluminum or stainless steel. The metal layer in such cases will provide oxygen barrier properties but also selected visual appearance. In some instances, metal coatings may be applied using vacuum deposition, from which the final metal coatings will have thicknesses in the nanometer range. The metallic layer may also act as a strengthening layer, and in such cases, the metal layer will be thicker, i.e., in the micrometer range. In addition, colored low density polyethylene resins are commonly used to create colored pipes, typically blue for cold potable water applications, and red for hot water. Furthermore, outer coating layers may be applied in the form of crosslinked polyethylene, for example PEX-b.

In any case, where thermoplastic polymers, such as EvOH, polyethylene, PEX-b pre-polymers, etc., co-extrusion technology is commonly used for this purpose. Co-extrusion is a process whereby a coating layer is applied to a polymeric pipe (e.g., a PEX pipe) by extruding a polymer-based material through a ring shaped die as the polymeric pipe is passed through the die. Because of difficulties in obtaining thin coating layers with the co-extrusion process, the practical lower limit for the coating layer thickness is about 100 μm. Co-extrusion also presents other challenges, for example limited flexibility in operating conditions and in potential raw materials, high energy requirements, costly start-up times and purge requirements, and general difficulties with quality control such as obtaining a consistent coating layer thickness and an inability to effectively level the surface of the pipes. In the case where PEX-b technology is used for the outer layers, a secondary time-consuming and costly operation step is necessary.

SUMMARY

In some embodiments, a flexible tubular member includes a flexible tubular polymeric substrate, and a coating disposed on an outer surface of the tubular substrate. The coating includes a base layer disposed on an outer surface of the tubular substrate, and a topcoat layer disposed over the base layer. The base layer includes a radiation cured cross-linked acrylate polymer. The topcoat layer includes a radiation cured cross-linked polymer.

In other embodiments, a flexible tubular member includes a flexible tubular substrate and a coating disposed on an outer surface of the tubular substrate. The substrate includes a cross-linked polyethylene. The coating includes a radiation cured cross-linked acrylate base polymer layer disposed on an outer surface of the tubular substrate and a radiation cured cross-linked polymer topcoat layer disposed over the base layer. The base and topcoat layers each have a thickness of less than 60 microns thick and a total thickness of less than 100 microns. The peel strength between the tubular substrate and the crosslinked polymer layers is at least 300 psia.

In yet other embodiments, a flexible tubular member includes a flexible tubular substrate and a coating disposed on an outer surface of the tubular substrate. The substrate includes a cross-linked polyethylene. The coating includes a base layer disposed on an outer surface of the tubular substrate and a topcoat layer disposed over the base layer. The base layer includes a radiation cured cross-linked carboxyethyl acrylate polymer. The topcoat layer includes a radiation cured cross-linked polymer. The base layer and the topcoat layer each have a thickness of less than 60 microns and a total thickness of the base layer and the topcoat layer is less than 100 microns.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

According to some embodiments of the present invention, radiation cured coating layers are applied to a surface of a base pipe in order to provide a desired property. The radiation cured coating layers are crosslinked to various degrees depending on the particular application, and may be produced with a pre-determined coating layer thickness and/or multiple layers.

In some embodiments of the present invention, one or more layers are disposed on a base pipe. In some such embodiments, the base pipe comprises a polyolefin material. Such pipes may be manufactured from polyethylene, for example high density polyethylene (HDPE). However, the present invention is applicable where any type of polyethylene is used for the production of multi-layer plastic pipes, including low density polyethylene (LDPE), medium density polyethylene (MDPE), ultra-high molecular weight polyethylene (UHMWPE), PE 100, and PE 80. With each of the above polyethylene grades, the polymer chains may be cross-linked to form three-dimensional polymer networks (e.g., PEX pipe such as PEX-a, PEX-b, or PEX-c).

The radiation cured coating layers described herein, and the processes used to apply these coating layers, are applicable for a wide range of pipe dimensions and constructions conventionally employed, for example, as related to the outer diameter (OD), inner diameter (ID), wall thick thickness, number of layers in the complete pipe construction, and any combinations thereof.

The finished pipes described herein may have particular burst strength ratings (for example, the burst strength ratings provided in ASTM 876-04). For example, the burst strength at 23° C. may be at least 400 psi, at least 475 psi, or at least 550 psi.

Figure 1:
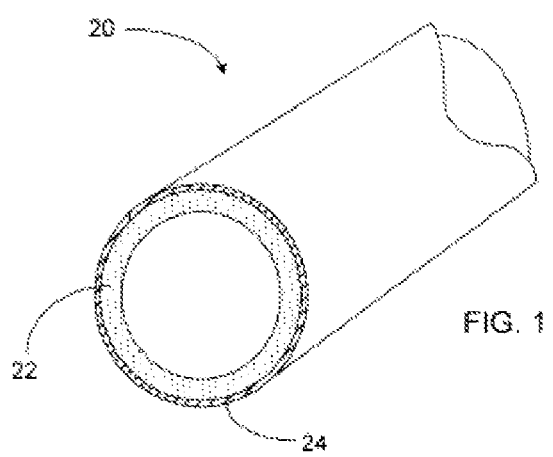
FIG. 1 shows a perspective view of a multi-layer plastic pipe according to some embodiments of the present invention.

FIG. 1 shows a perspective view of a multi-layer plastic pipe according to embodiments of the present invention. The multi-layer plastic pipe 20 includes a tubular member 22 with a first layer 24 disposed on an outer surface thereof. The first layer 24 may be any of the coating layers discussed herein.

Figure 2:
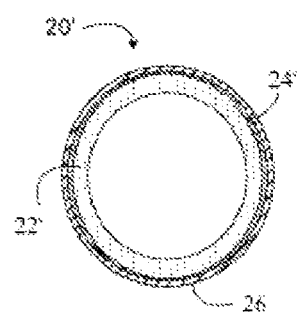
FIG. 2 shows a cross-sectional view of another multi-layer plastic pipe according to some embodiments of the present invention.

In addition, other coating configurations are also possible. For example, FIG. 2 shows a cross-sectional view of another multi-layer plastic pipe 20' according to some embodiments of the present invention. The pipe 20' comprises a tubular member 22' with a first coating layer 24' and a second coating layer 26 disposed over the first coating layer 24'. As discussed further below, such multi-layered pipes 20' may be produced by passing the tubular member 22' through multiple coating stages. In addition, the multiple layers may be combined to provide various properties, with the first layer 24' providing one or more properties and the second layer 26 providing the same, or different, property or properties as the first layer 24'.

In other embodiments, a base polymeric pipe (e.g., any of the base polymeric pipes described herein) has a metal layer disposed on an outer surface of the base polymeric pipe. A coating consisting of one or more layers may then be disposed on the outer surface of the metal layer. For example, any of the coating systems described herein, including any of the different coating formulations described herein, any of the numbers of coating layers provided below, and any of the combinations of coating layers described herein, may be used as the coating system disposed on the outer surface of the metal layer. The metal layer itself may comprise any suitable metal, such as Aluminum or stainless steel.

For specific embodiments, the plastic pipes can be produced with thin cured coating layer thicknesses with very precise control over thickness. For example, the entire coating may be less than 100 microns thick, less than 80 microns thick, less than 60 microns thick, less than 50 microns thick, less than 40 microns thick, less than 30 microns thick, less than 20 microns thick, less than 10 microns thick, between 7 microns and 80 microns, between 7 microns and 60 microns, between 7 microns and 40 microns, between 7 microns and 30 microns, between 7 microns and 20 microns, or between 7 microns and 15 microns. The entire coating thickness may be formed by one coating layer, or formed by multiple coating layers, each layer individually having a thickness of less than 50 microns, less than 40 microns thick, less than 30 microns thick, less than 20 microns thick, less than 10 microns thick, between 7 microns and 50 microns, between 7 microns and 40 microns, between 7 microns and 30 microns, between 7 microns and 20 microns, or between 7 microns and 15 microns. In contrast, typical co-extrusion systems provide a minimal thickness between 100 and 200 microns, with a concomitantly higher variability in the layer thickness, and therefore higher variability in the outer diameter of the pipe.

In some embodiments changes between grades may be implemented simply and conveniently in a short time relative to co-extrusion processes. For example, different pre-polymer formulations may contain different additives that provide for different characteristics. The time and materials to remove the old formulation from the coating system and introduce a new formulation would be relatively small compared to co-extrusion processes.

Some of the coating layers described herein may have color-adding materials. Furthermore, the multi-layer plastic pipes can be equipped with optional gloss level and/or with a smooth finish. In some embodiments, the coating composition is transparent, and in other embodiments, the coating composition includes color. The degree of color is optional and the flexibility in color design is unlimited. In some embodiments, the color layer may be semi-transparent. Such a semi-transparent coating layer allows print on the pipe to be visible through the coating layer and the print is thereby protected from abrasion and physical damage.

In some embodiments of the present invention, the multi-layered plastic pipes can be provided with one or more layers that yield UV Resistance. UV resistance can be obtained by adding, for example, hindered amine light stabilizers (commonly referred to as HALS compounds), nano-particles such as zinc oxide, or other compounds or substances that reduce UV damage.

In some embodiments, one or more of the coating layers provides oxygen barrier properties. Oxygen barrier coatings may be applied to PEX tubing and other plastic pipes, which in some embodiments are used for under floor heating systems. The oxygen barrier prevents or slows oxygen from crossing through the plastic pipe to the fluid within the pipe. Generally speaking, less oxygen entrained in the fluid within the pipe protects boilers, piping and other accessories that contain ferrous components from corrosion.

In addition, one or more of the layers may provide for scratch and abrasion resistance, enhanced mechanical performance, anti-microbial functionality, anti-static performance, adhesive attributes and leveling of a surface of the pipe. Also, more than one of the above functions may be provided in a single layer.

Figure 3:
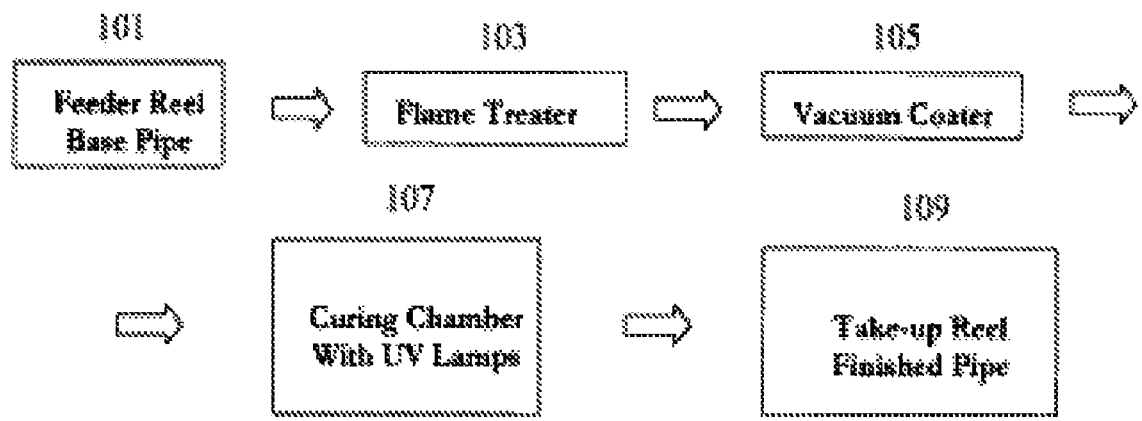
FIG. 3 is a flow chart depicting a process of producing multi-layer plastic pipes according to some embodiments of the present invention.

FIG. 3 shows a diagram of a process according to embodiments of the present invention. In step 101, the base pipe is fed off of a reel or other mechanism. The base pipe may be any of the types of base pipe referred to above (e.g., any of the PEX pipes described above). In other embodiments, the base pipe may be produced in-line according to any of the processes described above.

In some embodiments, the base pipe is run through an oxidizer process (step 103) in order to oxidize the surface of the base pipe. This process may include one or more of a flame treatment (as shown), a corona treatment, a plasma treatment, or other appropriate processes to oxidize the outer surface of pipe. The oxidation process generally raises the surface energy of the surface being treated, for example to more than 50 dynes, more than 60 dynes, more than 70 dynes, more than 80 dynes, or increase the surface energy by at least 20 dynes, by at least 30 dynes, by at least 40 dynes, or by at least 50 dynes. In one embodiment, the oxidation process increases the surface energy from about 30 dynes to more than 70 dynes.

In some embodiments, as further described below, the chemical composition of the coating layer is such that it will form strong bonds with the higher energy, oxidized outer surface relative to the bonds that would be formed with a lower energy, non-oxidized surface. For example, acidic components in the coating formulations described below may interact with the outer surface of the pipe, possibly through either hydrogen bonding and/or covalent bonding. Relatively higher levels of adhesion are beneficial for some flexible pipe applications in order to accommodate the forces resulting from flexing the piping material. Adhesion to polyolefins is extremely difficult to achieve with any coating system, especially with radiation cured coatings. The coatings and the process described herein result in excellent adhesion characteristics to polyolefins (greater than about 300 psi, greater than about 350 psi, greater than about 400 psi, greater than about 450 psi, greater than about 500 psi, or greater than about 600 psi pull-off adhesive strength, as tested with the PosiTest Pull-Off Adhesion Tester used in accordance with ASTM D4541).

The pipe is then run through a coating process (step 105), in which the pre-polymer composition for a first coating layer is disposed on a surface (e.g., the outer surface) of the pipe. The coating process employs a suitable mechanism for accurately and evenly spreading a pre-polymer composition on a surface of the pipe. For example, the coating process may employ a spray coating system, a curtain coating system, a flood coating system, a wipe coating system, or a vacuum coating system, or any other system that will facilitate disposal of the pre-polymer composition on a surface of the pipe. The pipe may run through the coating process in a generally horizontal pathway or in a generally vertical pathway.

In some embodiments, the coating system is a vacuum coating system in which the pipe is run through a pre-polymer composition. The pipe exits the coating system through a port and the vacuum being drawn in through the port helps smooth the pre-polymer composition along the surface of the pipe. Some examples of the coating system are the vacuum coating systems produced by DV Systems.

In some exemplary processes, the base pipe is run through any of the coating systems mentioned above and the coating system is generally enclosed and under vacuum. As such, as the base pipe exits the enclosed coating system, air is drawn back along the surface of the pipe, which tends to draw excess pre-polymer solution back into the coating system and provide an even coating of pre-polymer solution around the base pipe. Such an operation may also provide for effective leveling of the surface of the pipe.

The pipe is then run through a curing apparatus (step 107). In some embodiments, the curing apparatus is a chamber through which the pipe runs, and the pre-polymer composition on a surface of the pipe is exposed to radiation. The radiation may be ultraviolet (UV) radiation and/or electron beam (EB) radiation. The residence time of the pipe in the curing apparatus is sufficiently long to partially or completely cure the pre-polymer solution to form a coating layer on the surface of the pipe. In order to provide sufficient curing, multiple curing stages may be placed in series. A variety of different configurations for imparting radiation on the coating layer may be used. For example, a number of UV lamps or EB emitters may be used in series in order to provide sufficient radiant energy to the coating layer. The speed of the system, and the resulting residence time of the coating layer in the curing portion of the system, can be adjusted for the desired level of cross-linking of the coating layer formulation. The coated pipe is then wound onto a reel (step 109).

It is noted that, although FIG. 3 shows a single coating/curing stage, multiple layers may be disposed on the pipe by placing multiple coating/curing stages in series. In some embodiments, a first coating layer may not be entirely cured in order to promote adhesion between the layers. The pipe may then be passed through a subsequent stage (e.g., a stage as described above with respect to FIG. 3) in which another layer is applied and partially or entirely cured on the pipe. Any number of coating stages can be provided in this process, for example one or more, two or more, three or more, four or more, five or more, six or more, between one and ten, between one and five, or between one and three coating layers. In some embodiments, different layers of the pipe impart different properties, while in other embodiments two or more layers may impart the same or similar properties to the pipe.

In some embodiments, each of the layers may be fully or substantially fully cured, while in other embodiments all or some of the intermediate layers may only be partially cured in order to promote adhesion between the layers. In some embodiments in which two or more layers are used and the intermediate layer(s) are not fully cured, the oxidation step 103 may be omitted for the intermediate layer(s).

Furthermore, leveling of the selected surface before cross-linking of the radiation curable coating formulation is yet another potential attribute of the radiation cured coatings. This comes from the fact that radiation curable pre-polymer formulations are truly low viscous liquids (no polymer included) before curing (crosslinking), and therefore, the pre-polymer formulations will indeed level the surface as opposed to co-extrusion processes.

It is also noted that many of the pre-polymer compositions described herein can be cured with a relatively short residence time in the curing apparatus (many such radiation-cured coating layers cure in one second or less), which may allow for relatively compact process layout and/or very rapid machine speeds. For example, machine speeds of approximately 70-100 meters/minute or faster are possible with some of the pre-polymer compositions and process configurations described herein. In addition, the processes of the present invention may consume less power than traditional co-extrusion systems, and the time required to change between product grades is typically greatly reduced due to the ease of changing between pre-polymer systems compared to grade changes in the traditional co-extrusion processes. Also, because some of the processes of the present invention do not significantly heat the pipe, no cooling apparatus (or any subsequent drying process after a water cooling process) is required, and the finished pipe is ready to wind on a spool immediately.

Furthermore, in some embodiments, the processes of the present invention may provide more consistent and repeatable dimensions for the pipe compared to traditional extrusion processes. Because the application of the pre-polymer composition is not performed with an extrusion operation, the layer of material may be much thinner and more consistent than co-extruded layers. The reduced thickness possible in some of the embodiments of the present invention also provides for reduced material consumption.

In some embodiments of the present invention, a radiation curable pre-polymer formulation includes one or more polymerizable components, various additives to enhance targeted properties of the pipe and, optionally, a photoinitiator system that initiates a cross-linking reaction when exposed to radiation. Some of these formulations may be cured by UV radiation, while other formulations may be adapted to be cured by other types of radiation such as electron beam (EB) radiation. As further discussed below, in some embodiments in which the pre-polymer system will be EB cured, the formulation may exclude the photoinitiator system. Also, when certain base oligomers such as Novacure radiation curable compositions (Ashland Chemical) are used, no photoinitiator system is needed for either EB or UV curing.

A combination of a photoinitiator system and an appropriate monomer/oligomer formulation may be included in pre-polymer systems that are UV cured. Some exemplary UV curable polymers include carbon-carbon double and/or triple bonds capable of reacting with free radicals, such as acrylates and methacrylates, allyl groups, styrenes, thiol/enes, and/or, any combination of such functionalities and/or any of their derivatives. The pre-polymer system may also be a photoinduced cationic polymerization system. Exemplary chemistries for cationically cross-linkable polymer systems include cycloaliphatic epoxies and other cyclic ethers such as oxetanes; vinyl ethers; and styrene derivatives. In addition, photoinitiator-free systems based on maleimide chemistry may be used. These and any other suitable radiation curable chemistry may be employed to achieve the desired targeted properties.

In contrast to UV-curing where the light quantum normally is absorbed by the chromophoric photoinitiator, electron beam (EB) curing of the present invention takes advantage of the fact that fast electrons lose their energy by coulomb interaction with the bulk material itself. Simplified, this means that when a reactive coating formulation is irradiated by an electron beam source, free radicals are created in the bulk material and the polymerization starts.

Any of the formulations described herein may be utilized in an EB curing process. As mentioned above, in EB curing the photoinitiator may be excluded from the formulation.

The polymerizable components of the pre-polymer formulation may comprise monomers (i.e., low-viscosity reactive diluents), oligomers or pre-polymer systems, or a combination thereof. Independent of polymerization mechanism chosen, oligomers or pre-polymers used in the formulations may have from 1 to 250, from 1 to 200, from 1 to 100, from 1 to 75, from 1 to 60, from 1 to 50, from 1 to 25, or from 1 to 10 monomeric units. The oligomers or pre-polymers may have a molecular weight from 500 to 10,000, from 500 to 7,500, from 500 to 5,000, from 500 to 3,000, from 1,000 to 10,000, from 1,000 to 7,500, from 1,000 to 5,000, or from 1,000 to 3,000. One or more of the polymerizable components of the pre-polymer formulation may be added to modify the glass transition temperature of the cured coating layer. In some embodiments, it is desirable that the glass transition temperature of the cured coating layer be at or about the lowest service temperature of the pipe. As such, the target glass transition temperature may be about −5° C., at least about −5° C., at least about −10° C., between about −10° C. and about 0° C., or between about −10° C. and about 10° C.

In some embodiments, all monomers and oligomers/pre-polymers present in the formulation have at least one polymerizable moiety per molecule, and in some cases at least one of the components present (e.g., the oligomer/pre-polymer) is multi-functional to facilitate crosslinking. These multi-functional components may be adapted for free radical polymerization and may include acrylate and/or methacrylate functionalities as the main polymerizable unit. If cationic chemistry is utilized, the cationically induced crosslinking may be facilitated by using cyclic ethers, such as cycloaliphatic epoxies, as the main component. As is known in the art, one unit of unsaturation and/or cyclic ether per molecule is called mono-functional, two units of unsaturation and/or cyclic ether per molecule are known as difunctional, and so on. In some embodiments of the invention, one or more of the components of the formulation has two or more ethylenically unsaturated groups and/or cyclic ethers per molecule.

A curable composition can include up to 100% of one or more oligomers and/or monomers. For example, the composition may include from about 10% to 100%, from about 10% to about 99%, from about 50% to 100%, from about 50% to about 99%, from about 70% to 100%, from about 70% to about 99%, from about 80% to 100%, or from about 80% to about 99% of the one or more oligomers and/or monomers. In some embodiments, the pre-polymer formulation may have from about 10% to about 80%, from about 20% to about 60%, from about 25% to about 50%, or from about 25% to about 40%, of the oligomer or pre-polymer. In addition, in some embodiments the pre-polymer formulation may have from about 10% to about 80%, from about 20% to about 60%, from about 25% to about 50%, or from about 25% to about 40%, of the monomer or reactive diluent.

Particularly suitable monomers and reactive diluents include acrylate or methacrylate based compounds. Examples include 1,6-hexanediol diacrylate, 1,3-bytylene glycol diacrylate, diethylene glycol diacrylate, trimethylolpropane triacrylate, neopentyl glycol diacrylate, polyethylene glycol 200 diacrylate, tetraethylene glycol diacrylate, triethylene diacrylate, pentaerythritol tetraacrylate, tripropylene glycol diacrylate, ethoxylated bisphenol-A diacrylate, propylene glycol (mono)dimethacrylate, trimethylolpropane diacrylate, di-trimethylolpropane tetraacrylate, triacrylate of tris(hydroxyethyl) isocyanurate, dipentaerythritol hydroxypentaacrylate, pentaerythritol triacrylate, ethoxylated trimethylolpropane triacrylate, triethylene glycol dimethacrylate, ethylene glycol dimethacrylate, tetraethylene glycol dimethacrylate, polyethylene glycol-200 dimethacrylate, 1,6-hexanediol dimethacrylate, neopentyl glycol dimethacrylate, polyethylene glycol-600 dimethacrylate, 1,3-butylene glycol dimethacrylate, ethoxylated bisphenol-A dimethacrylate, trimethylolpropane trimethacrylate, 1,4-butanediol diacrylate, diethylene glycol dimethacrylate, pentaerythritol tetramethacrylate, glycerin dimethacrylate, trimethylolpropane dimethacrylate, pentaerythritol trimethacrylate, pentaerythritol dimethacrylate, pentaerythritol diacrylate, aminoplast(meth)acrylates, acrylated oils such as linseed, soy bean oil, castor oil, etc.

Other applicable polymerizable compounds include (meth)acrylamides, maleimides, vinyl acetate, vinyl caprolactam, thiols and polythiols. Styrene derivatives are also readily applicable within the framework of this invention. A combination of any of these monomers and reactive diluents may also be used.

Useful oligomers and pre-polymers include resins having acrylate functionality. Such reactive compounds may have a similar structure to, or be derived from, polyurethane acrylates, epoxy acrylates, silicone acrylates, and polyester acrylates. Other exemplary compounds are (meth)acrylated epoxies, (meth)acrylated polyesters, (meth)acrylated silicones, (meth)acrylated urethanes/polyurethanes, (meth)acrylated polybutadiene, (meth)acrylated acrylic oligomers and polymers, and the like. In addition, any combination of these oligomers or pre-polymers may also be used.

For free radical chemistry based on acrylate chemistry, specific examples of polymerizable components include a difunctional urethane acrylate oligomer (such as Ebecryl 4833 available from Cytec), a monofunctional acrylate monomer (such as CD 420, SR285, CD9055, all available from Sartomer), and a monofunctional urethane acrylate monomer (such as Ebecryl 1039 available from Cytec).

In some embodiments, formulations also include reactive intermediates for crosslinking by cationic polymerization. Exemplary cationic systems of the present invention are based on cyclic ethers, cycloaliphatic epoxies, oxetanes, polyols, and vinyl ethers. Illustrative of the cycloaliphatic epoxides useful as base materials in the present invention are 3,4-epoxycyclohexylmethyl-3,4-epoxycyclohexane carboxylate (UVR 6110, Union Carbide), bis-(3,4-epoxycyclohexyl)adipate (UVR 6128, Union Carbide), methyl 3,4-epoxy-cyclohexane-carboxylate, ethyl 3,4-epoxycyclohexane-carboxylate, propyl 3,4-epoxycyclohexane-carboxylate, isopropyl 3,4-epoxycyclohexane-carboxylate, n-butyl-, s-butyl-, and t-butyl 3,4-epoxycyclohexane-carboxylate; the various amyl and hexyl 3,4-epoxycyclohexane-carboxylates, methyl 3,4-epoxy-3-methyl-cyclohexane carboxylate, ethyl 3,4-epoxy-3-methyl-cyclohexane carboxylate, methyl 3,4-epoxy-4-methyl-cyclohexane carboxylate, ethyl 3,4-epoxy-4-methyl-cyclohexane carboxylate, butyl 3,4-epoxy-3-methyl-cyclohexane carboxylate, butyl 3,4-epoxy-4-methyl-cyclohexane carboxylate, methyl 3,4-epoxy-6-methyl-cyclohexane carboxylate, ethyl 3,4-epoxy-6-methyl-cyclohexane carboxylate, butyl 3,4-epoxy-6-methyl-cyclohexane carboxylate, dialkyl 4,5-epoxycyclohexane-1,2-dicarboxylates, as well mixed dialkyl 4,5-epoxycyclohexane-1,2-dicarboxylates, and the like. Mixtures of any combination of the above compounds may also be used, including mixtures of any of the above cycloaliphatic epoxides.

In order to facilitate the cross-linking process where cationic systems are employed, polyols may be used along with any of the above cationic or epoxy cross-linking compounds. For example, the TONE (Dow Chemical) polyols, dendritic polyester polyols (e.g., those sold under the name BOLTORN by Perstorp), or other suitable polyols.

In some embodiments in which photoinitiators that are used, the photoinitiators do not cause discoloration, have low volatility, and do not lead to undesired side-reactions in the curing process. Examples of suitable photoinitiators for use in the present invention include photoinitiators that comprise benzophenone derivatives, such as Esacure® ONE (Lamberti) (difunctional-alpha-hydroxy ketone), Esacure® TPO (Lamberti) (2,4,6 trimethylbenzoyldiphenylphosphine oxide), Esacure® KIP 100F (Lamberti) (oligo (2-hydroxy-2-methyl-1-4 (1-methylvinyl) propanone and 2-hydroxy-2-methyl-1-phenyl propan-1-one (monomeric)); Esacure® KT046 (Lamberti) (mixture of trimethylbenzoyldiphenylphosphine oxide, alpha-hydroxyketones and benzophenone derivatives); Irgacure® 2959 (Ciba) (1-[4-(2-hydroxy-ethoxy)-phenyl]-2-hydroxy-2-methyl-1-propane-1-one); and Irgacure® 819 (Ciba) (bis(2,4,6 trimethylbenzoyl)-phenylphosphine oxide); Esacure® KIP 150 (Lamberti) (oligo [2-hydroxy-2-methyl-1-[4-(1-methylvinyl)phenyl]propanone]). In addition, synergists and/or co-initiators may be used to improve the processing and curing conditions, and may optionally be used for the purpose of this invention. Specific examples include acrylated amine synergists such as Ebecryl® P104, Ebecryl® P115, and Ebecryl® 7100, all supplied by Cytec Industries.

Additional photoinitiators suitable in the present invention include benzophenone derivatives; the class of benzoin alkyl ethers, such as benzoin methyl ether, benzoin ethyl ether, benzoin isopropyl ether, and benzoin isobutyl ether. Other useful photoinitiators come from the class of dialkoxyacetophenones, for example, 2,2-dimethoxy-2-phenyl acetophenones (Irgacure® 651 by Ciba) and 2,2-dimethoxy-2-phenylaceto-phenone. Yet another group of photoinitiators include the aldehyde and ketone carbonyl compounds having at least one aromatic nucleus attached directly to the carboxyl group. These particular initiators include benzophenone, acetophenones, o-methoxybenzophenone, thioxanthone, isopropyl thioxanthone acetonaphtalenequinone, methyl ethyl ketone, valerophenone, alpha-phenyl-butyrophenone, p-morpholinopropiophenone, hexanophenone, dibenzosuberone, 4-morpholinobenzophenone, 4'-morpholinodeoxybenzoin, p-diacetylbenzene, 4-aminobenzophenone, 4'-methoxyacetophenone, alpha-tetralone, 9-acetylphenantrene, 2-acethyl-phenanthrene, 10-thio-xanthenone, benzaldehyde, 3-acetylphenanthrene, 3-acetylindone, 9-fluorenone, 1-indanone, 1,3,5-triacetylbenzene, thioxanthen-9-one, xanthene-9-one, 7-H-benz[de]-anthracene-7-one, fluorine-9-one, 4,4'-bis(dimethylamino)-benzophenone, 1-naphtaldehyde, 1'-acetonaphthone, 2'-aceto-naphthone, 2,3-butedione, acetonaphthene, and benz[a]anthracene 7,12 diene. Phospines such as triphenylphosphine, tri-o-tolylphosphine, and bisacyl phosphine oxide derivatives, are also useful photoinitiators. In addition, any combination of the above photoinitiators may be used.

In some embodiments, the formulations include photoinitiators for cationic polymerization including those coming from triarylsulfonium and/or diaryliodonium salts. The fundamental photochemical reaction mechanism involves several electron transfer steps, but the practical consequence is that a strong protonic acid is produced (super acid). The acid is the active moiety, which subsequently initiates the cationic polymerization. Two examples of such photoinitiators are triarylsulfonium hexafluoroantimonate ($Ar^+SbF_6^-$) and triarylsulfonium hexafluorophosphate ($Ar^+F_6^-$). These photoinitiators are typically commercially available as 50% solutions in propylene carbonate. The main difference between the two examples given is their effect on the polymerization rate. The larger sized antimonate anion gives a considerably higher polymerization rate than the phosphate counter ion.

The corresponding diaryliodonium salts have a similar photolysis mechanism, which again generates a super acid. In addition, the iodonium salts may yield the super acid by a catalyzed thermally activated process, as an alternative to the photochemical route, which is not the case for the sulfonium salts.

A curable composition can include up to 10% of one or more photoinitiators. For example, the composition can include about 7.5%, from about 0.25% to about 4%, from about 2% to about 10%, from about 4% to about 9%, or from about 6% to about 9%, of the one or more photoinitiators. In other embodiments, the curable composition is substantially free of photoinitiators.

The additives in the pre-polymer formulation (such as a nano-sized material or other oxygen barrier additive, a UV radiation absorber, a stabilizer, a colorant, a flame retardant, a static electricity reducer, and/or a friction reducer) can affect the strength, color, UV resistance, stability and other characteristics of the composition. In addition, certain additives or combinations of additives may result in a layer with any combination of these properties. For example, some pigments may provide some oxygen barrier properties, and pigments may also be added to a formulation along with oxygen barrier additives and/or UV protection additives to provide a combination or properties.

In some embodiments, the curable composition includes one or more hindered amine light stabilizers (HALS), e.g., to protect the cured composition from oxidation and degradation. Examples of hindered amine light stabilizers include Tinuvin 123 (Ciba), Tinuvin 622 (Ciba), Tinuvin 770 (Ciba), Cyasorb 3853 (Cytec), Cyasorb 3529 (Cytec) and Hostavin PR-31 (Clariant). A curable composition can include up to about 15% of one or more hindered amine light stabilizers. For example, the composition can include from about 0.1% to about 5%, or from about 0.1% to about 3% of the one or more hindered amine light stabilizers. In other embodiments, the curable composition is substantially free of a light stabilizer.

In some embodiments, the curable composition includes one or more materials capable of absorbing UV radiation ("UV absorbers"), e.g., to protect plastic tube 22 from damage caused by UV radiation. Examples of UV absorbers include benzotriazole derivatives, titanium dioxide, zinc oxide, and cerium oxide. A curable composition can include up to about 15% of one or more UV absorbers. For example, the composition can include from about 0.1% to about 5%, or from about 0.1% to about 3% of the one or more UV absorbers. In other embodiments, the curable composition is substantially free of a UV absorber.

In some embodiments, the curable composition includes one or more color-adding materials such as pigments, pigment dispersions, dyes, or other colorants. Examples of these color-adding materials include Chromacure TPGDA Blue HS (Plasticolors), TPGDA Red 170 (Plasticolors) and TPGDA Purple (Plasticolors). A curable composition can include up to about 15% of one or more color-adding materials. For example, the composition can include up to about 5%, from about 0.5% to about 5%, from about 4% to about 10%, or from about 6% to about 8% of the one or more color-adding materials. In other embodiments, the curable composition is substantially free of a color-adding material.

In some embodiments, the curable composition includes one or more nano-sized materials, e.g., dispersed to enhance the strength of the cured composition, add resistance to UV damage, decrease the build up of static electricity, improve resistance to scratch and abrasion damage, provide anti-microbial properties, or to decrease gas permeation. As used herein, "nano-sized" means having at least one dimension smaller than approximately 100 nm. Examples of nano-sized materials include clays, metal oxides, carbon nanotubes, and organic particles. The form of the nano-sized materials can be, for example, particles, fibers, and/or tubes. A curable composition can include up to about 15% of one or more nano-sized materials. For example, the composition can include up to about 10%, from about 0.1% to about 5%, or from about 0.5% to about 3% of the one or more nano-sized materials. In other embodiments, the curable composition is substantially free of a nano-sized material.

In some embodiments, a curable composition contains approximately 10-60% of a difunctional urethane acrylate oligomer Ebecryl 4833 (Cytec); approximately 20-70% monofunctional acrylate monomer CD 420 (Sartomer); approximately 0.1-8% of a mixture of photoinitiators including benzophenone derivatives, alpha-hydroxy ketone derivatives and/or bisacyl phosphine oxide derivatives; approximately 0.1-5% of a benzotriazole UV absorber; approximately 0.1-5% of a hindered amine light stabilizer Cyasorb 3853 (Cytec); approximately 0.1-15% of an organic pigment dispersed in a mono or difunctional acrylate monomer; approximately 0-40% of a pigment system including (e.g., consisting of) a pigment, a pigment dispersant/stabilizer, a surfactant, a solvent, or a reactive diluent/monomer, or dyes; and approximately 0-10% of a surface slip additive to reduce the coefficient of friction of the cured composition.

Following is a list of exemplary ranges for embodiments of the present invention:

Topcoat

| Material | Purpose | Range #1 (wt %) | Range #2 (wt %) |
|---|---|---|---|
| Oligomer | Base Resin | 10-100 | 40-99 |
| Reactive diluents/monomer | Adhesion/Tg/viscosity adjustment | 0.1-90 | 1-50 |
| Photoinitiators* | Photoinitiators | 0.5-10 | 1-5 |
| Slip aid** | Slip aid/surface additive | 0.1-1 | 0.5-1 |
| Scratch resistant additive** | Scratch resistance | 0.1-7.5 | 1-6 |

*Optional photoinitiator when EB curing is used
**Optional components. One, all, or any combination of these additives may be present in the formulation.

Basecoat

| Material | Purpose | Range #1 (wt %) | Range #2 (wt %) |
|---|---|---|---|
| Monomer | Base resin/gas Barrier | 10-99 | 50-99 |
| Viscosity modifier/monomer | Viscosity Modifier | 0.1-80 | 0.1-50 |
| TPGDA Red* | Pigment | 0.1-7.5 | 1-5 |
| TPGDA Blue* | Pigment | 0.1-7.5 | 1-5 |
| Talc such as platy talc or leafing aluminum or other fillers * | Oxygen barrier | 0.1-25 | 0.1-10 |
| Photoinitiators** | Initiation | 0.5-5 | 1-4 |

*Optional components One, all, or any combination of these additives may be present in the formulation.
**Optional photoinitiator when EB curing is used

EXAMPLES

The exemplary curable compositions disclosed below were prepared by combining the identified components of the composition by, for example, mixing in batches using a high shear disperser or a low speed liquid blender, until a homogenous composition was formed. A PEX-a pipe was run through a flame treatment stage in order to oxidize the surface of the pipe, and then the pipe was run through a coating system that dispensed a layer of the coating composition on to the surface of the pipe. The coating was dispensed under to ensure that the formulation was evenly distributed on the surface of the pipe.

The coated pipe was then exposed to UV radiation via a commercially available UV lamp system for a sufficient period of time to cure the coating composition on the pipe. The pipe was then wound on a spool.

With the two-layer systems described below, the first layer was not fully cured and was subsequently run through a second coating system (which was similar to the first coating system). The second, outer coating formulation was disposed on the first, partially cured layer and cured with a UV lamp. The pipe was then wound on a spool.

Various testing was then performed on samples of the finished pipe. The PosiTest Pull-Off Adhesion Tester was used in accordance with ASTM D4541 to test the adhesion of the coating to the pipe. All of the examples shown below provided adhesion levels of at least 300 psi indicating suitable adhesion for contemplated applications.

When wound on a reel, Examples 1-8 had some delamination occur. In addition, some of Examples 1/8 were subjected to an Expansion Test, in which the pipe is cooled to 20° F., an expansion member is placed in the pipe and the pipe is expanded to roughly twice the original diameter. For examples 1-8, delamination occurred in the Expansion test as well when samples were wound onto the spool. For examples 9-11, no delamination was observed either with the Expansion Test or on the spool.

Example 1

Colored Plastic Pipe (Blue)

| Material | Supplier | Description | Wt. % |
|---|---|---|---|
| Ebecryl 4833 | Cytec | Aliphatic urethane diacrylate oligomer | 32 |
| SR285 | Sartomer | Tetrahydrofurfuryl acrylate | 21.75 |
| CD420 | Sartomer | Monofunctional acrylate ester | 32 |
| Esacure KIP100F | Lamberti | Photoinitiator blend | 5 |

-continued

| Material | Supplier | Description | Wt. % |
|---|---|---|---|
| Esacure KTO46 | Lamberti | Photoinitiator blend | 2.5 |
| Ceraflour 988 | Byk Chemie | Amide modified polyethylene wax | 5 |
| Byk 331 | Byk Chemie | Silicone surface agent | 0.5 |
| TPGDA HS Blue | Plasticolors | Pigment dispersion in TPGDA | 1.25 |
| TOTAL | | | 100 |

Example 2

Colored Plastic Pipe (Blue)

| Material | Supplier | Description | Wt. % |
|---|---|---|---|
| Ebecryl 4833 | Cytec | Aliphatic urethane diacrylate oligomer | 31.75 |
| Ebecryl 1039 | Cytec | Tetrahydrofurfuryl acrylate | 50 |
| Carboxyethyl acrylate | Cytec | Adhesion promoter | 8 |
| Esacure KIP100F | Lamberti | Photoinitiator blend | 5 |
| Esacure KTO46 | Lamberti | Photoinitiator blend | 2.5 |
| Ceraflour 988 | Byk Chemie | Amide modified polyethylene wax | 1 |
| Byk 331 | Byk Chemie | Silicone surface agent | 0.5 |
| TPGDA HS Blue | Plasticolors | Pigment dispersion in TPGDA | 1.25 |
| TOTAL | | | 100 |

Example 3

Colored Plastic Pipe (Red)

| Material | Supplier | Description | Wt. % |
|---|---|---|---|
| Ebecryl 4833 | Cytec | Aliphatic urethane diacrylate oligomer | 31 |
| SR285 | Sartomer | Tetrahydrofurfuryl acrylate | 21 |
| CD420 | Sartomer | Monofunctional acrylate ester | 31.75 |
| Esacure KIP100F | Lamberti | Photoinitiator blend | 5 |
| Esacure KTO46 | Lamberti | Photoinitiator blend | 2.5 |
| Ceraflour 988 | Byk Chemie | Amide modified polyethylene wax | 5 |
| Byk 331 | Byk Chemie | Silicone surface agent | 0.5 |
| TPGDA Red 170 | Plasticolors | Pigment dispersion in TPGDA | 3.25 |
| TOTAL | | | 100 |

Example 4

Plastic Pipe (Oxygen Barrier)

| Material | Supplier | Description | Wt. % |
|---|---|---|---|
| Ebecryl 4833 | Cytec | Aliphatic urethane diacrylate oligomer | 31.75 |
| Ebecryl 1039 | Cytec | Tetrahydrofurfuryl acrylate | 40 |
| Ebecryl 1360 | Cytec | Silicon acrylate (Oxygen Barrier) | 10 |
| Carboxyethyl acrylate | Cytec | Adhesion promoter | 8 |
| Esacure KIP100F | Lamberti | Photoinitiator blend | 5 |
| Esacure KTO46 | Lamberti | Photoinitiator blend | 2.5 |

-continued

| Material | Supplier | Description | Wt. % |
|---|---|---|---|
| Ceraflour 988 | Byk Chemie | Amide modified polyethylene wax | 1 |
| Byk 331 | Byk Chemie | Silicone surface agent | 0.5 |
| TPGDA HS Blue | Plasticolors | Pigment dispersion in TPGDA | 1.25 |
| TOTAL | | | 100 |

Example 5

Plastic Pipe (Oxygen Barrier)

| Material | Supplier | Description | Wt. % |
|---|---|---|---|
| Ebecryl 4833 | Cytec | Aliphatic urethane diacrylate oligomer | 31.75 |
| Ebecryl 1039 | Cytec | Tetrahydrofurfuryl acrylate | 50 |
| Carboxyethyl acrylate | Cytec | Adhesion promoter | 8 |
| Esacure KIP100F | Lamberti | Photoinitiator blend | 5 |
| Esacure KTO46 | Lamberti | Photoinitiator blend | 2.5 |
| Ceraflour 988 | Byk Chemie | Amide modified polyethylene wax | 1 |
| Byk 331 | Byk Chemie | Silicone surface agent | 0.5 |
| NanoByk Zinc Oxide | Byk Chemie | Oxygen Barrier | 5 |
| TOTAL | | | 100 |

Example 6

Plastic Pipe (Oxygen Barrier); Cationic Chemistry

| Material | Supplier | Description | Wt. % |
|---|---|---|---|
| UVR 6105 | Union Carbide | Cycloaliphatic Epoxy | 32 |
| UVR 6000 | Union Carbide | Cycloaliphatic Epoxy | 38 |
| Photomer 4006 | Henkel | Polyol | 18 |
| Epoxidized Castor Oil | Proprietary | Aliphatic epoxy | 7.5 |
| Byk 307 | Byk Chemie | Flowing agent | 0.25 |
| Byk 371 | Byk Chemie | Leveling agent | 0.25 |
| UVI 6990 | Union Carbide | Photoinitiator | 4 |
| TOTAL | | | 100 |

Example 7

Plastic Pipe (Oxygen Barrier); Thiol/Ene Chemistry

| Material | Supplier | Description | Wt. % |
|---|---|---|---|
| TMPMP | Bruno Bock | Trimethylolpropane tris(3-mercaptopropionate) | 60.4 |
| SR 533 | Sartomer | 1,3,5-Triallyl-1,3,5-triazine-2,4,6 (1H,3H5H)-trione | 37.7 |
| Esacure KTO46 | Lamberti | Proprietary photoinitiator blend | 1.9 |
| TOTAL | | | 100 |

Example 8

Plastic Pipe (Oxygen Barrier); Dual Coating Layer

Base-Coat:

| Material | Supplier | Description | Wt. % |
|---|---|---|---|
| Acrylic Acid | Aldrich | Acrylic acid | 92.8 |
| Jaylink JL-103M | Bomar | Polymerizable cellulosic thickener | 5.2 |
| Esacure KTO46 | Lamberti | Proprietary photoinitiator blend | 2.1 |
| TOTAL | | | 100 |

Top-Coat:

| Material | Supplier | Description | Wt. % |
|---|---|---|---|
| Ebecryl 4833 | Cytec | Aliphatic urethane acrylate | 20.4 |
| CD 420 | Sartomer | Acrylic acrylate monomer | 40.7 |
| SR 285 | Sartomer | Tetrahydrofurfuryl acrylate | 27.1 |
| Esacure KIP 100F | Lamberti | Photoinitiator | 2.5 |
| Esacure KTO 46 | Lamberti | Photoinitiator | 5.1 |
| Byk 331 | Byk Chemie | Silicone slip ad | 0.1 |
| Ceraflour | Byk Chemie | Modified polyethylene wax | 4.1 |
| TOTAL | | | 100 |

Example 9

(Blue Two-Layer Plastic Pipe, Base Coat); Two-Layered Coating (See Top Coat Composition Below)

| Material | Supplier | Description | Wt. % |
|---|---|---|---|
| CD 9055 | Cytec | Carboxyethyl acrylate | 85 |
| Esacure TPO | Lamberti | Photoinitiator | 3 |
| SR 238 B | Sartomer | Cross-linking agent | 10 |
| TPGDA HS Blue | Plasticolors | Blue pigment dispersion in TPGDA | 2 |
| TOTAL | | | 100 |

Example 10

(Red Two-Layer Plastic Pipe, Base Coat); Two-Layered Coating (See Top Coat Composition Below)

| Material | Supplier | Description | Wt. % |
|---|---|---|---|
| CD 9055 | Cytec | Carboxyethyl acrylate | 83.20 |
| Esacure TPO | Lamberti | Photoinitiator | 3 |
| SR 238 B | Sartomer | Cross-linking agent | 10 |
| TPGDA HS Red | Plasticolors | Red pigment dispersion in TPGDA | 3.80 |
| TOTAL | | | 100 |

Example 11

(Oxygen Barrier Two-Layer Plastic Pipe, Base Coat); Two-Layered Coating (See Top Coat Composition Below)

| Material | Supplier | Description | Wt. % |
|---|---|---|---|
| CD 9055 | Cytec | Carboxyethyl acrylate; Oxygen barrier | 81 |
| Esacure TPO | Lamberti | Photoinitiator | 3 |
| SR 238 B | Sartomer | Cross-linking agent | 10 |
| Nicron 674 | Luzenac | Platy talc, Oxygen Barrier | 6 |
| TOTAL | | | 100 |

Top Coat for Examples 9-11:

| Material | Supplier | Description | Wt. % |
|---|---|---|---|
| E20089 | Sartomer | Monomer/Oligomer blend | 79.00 |
| DC 57 | Dow Corning | Silicone surface additive | 0.50 |
| Esacure ONE | Lamberti | Photoinitiator | 3.75 |
| Esacure TPO | Lamberti | Photoinitiator | 1.75 |
| SR 238 B | Sartomer | Crosslinking agent | 10 |
| Ceraflour 988 | Byk Chemie | Slip agent | 5.00 |
| TOTAL | | | 100 |

Radiation cured coatings are typically known for being very hard and protective, and flexibility is usually not one of the favorable characteristics. It is well known that low flexibility affects adhesion negatively, especially on plastics such as for example polyolefins. However, for some of the coatings described herein, the produced coatings are very durable and protective with excellent mechanical performance, and at the same time, the coatings are truly flexible giving excellent adhesion to polyolefins such as PEX tubing. Furthermore, the coatings display very good low-temperature flexibility and extensibility while maintaining its abrasion resistance.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A flexible tubular member comprising:
   a flexible tubular polymeric substrate; and
   a coating disposed on an outer surface of the tubular substrate, the coating including:
      a base layer disposed on an outer surface of the tubular substrate, the base layer including a radiation cured cross-linked acrylate polymer; and
      a topcoat layer disposed directly on the base layer, the topcoat layer including a radiation cured cross-linked acrylate polymer, wherein the acrylate polymer of the topcoat layer is different from the acrylate polymer of the base layer.

2. The flexible tubular member of claim 1, wherein the polymeric substrate includes a polyolefin.

3. The flexible tubular member of claim 2, wherein the polyolefin is a cross-linked polyethylene.

4. The flexible tubular member of claim 1, wherein the base layer and the topcoat layer each have a thickness of less than 60 microns and a total thickness of the base layer and the topcoat layer is less than 100 microns.

5. The flexible tubular member of claim 1, wherein at least one of the base layer and the topcoat layer include a photoinitiator.

6. The flexible tubular member of claim 5, wherein each of the base layer and the topcoat layer include a photoinitiator.

7. The flexible tubular member of claim 1, wherein the coating further includes an oxygen barrier or a colorant, or combinations thereof.

8. The flexible tubular member of claim 1, wherein the acrylate in the base layer is a carboxyethyl acrylate.

9. The flexible tubular member of claim 1, wherein the peel strength between the tubular substrate and the coating is at least 300 psi.

10. The flexible tubular member of claim 1, wherein the flexible tubular polymeric substrate includes a metallic layer forming the outer surface of the tubular substrate.

11. A flexible tubular member comprising:
   a flexible tubular substrate comprising a cross-linked polyethylene; and
   a coating disposed on an outer surface of the tubular substrate, the coating comprising a radiation cured cross-linked acrylate base polymer layer disposed on an outer surface of the tubular substrate and a radiation cured cross-linked acrylate polymer topcoat layer disposed directly on the base layer wherein the base and topcoat layers each have a thickness of less than 60 microns thick and a total thickness of less than 100 microns wherein the peel strength between the tubular substrate and the crosslinked polymer layers is at least 300 psi, wherein the acrylate polymer of the topcoat layer is different from the acrylate polymer of the base layer.

12. The flexible tubular member of claim 11 wherein the coating comprises an oxygen barrier material or a colorant, or combinations thereof.

13. The flexible tubular member of claim 11 wherein the coating comprises a photoinitiator.

14. The flexible tubular member of claim 11 wherein at least one of the base or topcoat layers comprises crosslinked carboxyethyl acrylate.

15. A flexible tubular member comprising:
   a flexible tubular substrate including a cross-linked polyethylene; and
   a coating disposed on an outer surface of the tubular substrate, the coating including:
      a base layer disposed on an outer surface of the tubular substrate, the base layer including a radiation cured cross-linked carboxyethyl acrylate polymer; and
      a topcoat layer disposed directly on the base layer, the topcoat layer including a radiation cured cross-linked acrylate polymer, wherein the base layer and the topcoat layer each have a thickness of less than 60 microns and a total thickness of the base layer and the topcoat layer is less than 100 microns, wherein the acrylate polymer of the topcoat layer is different from the acrylate polymer of the base layer.

16. The flexible tubular member of claim 15, wherein the carboxyethyl acrylate polymer is present in the base layer in an amount of at least 81% by weight of the layer.

17. The flexible tubular member of claim 15, wherein at least one of the base layer and the topcoat layer include a photoinitiator.

18. The flexible tubular member of claim 15, wherein each of the base layer and the topcoat layer include a photoinitiator.

19. The flexible tubular member of claim 15, wherein the coating further includes an oxygen barrier or a colorant, or combinations thereof.

* * * * *